Oct. 3, 1967

H. GERJETS ETAL 3,345,490

MANUAL SWITCH ACTUATOR

Filed July 13, 1965

INVENTORS
Heinz Gerjets, Hans Elsner
Siegfried Wessdhoft
Michael J. Striker
ATTORNEY Oct. 3, 1967  H. GERJETS ETAL  3,345,490

MANUAL SWITCH ACTUATOR

Filed July 13, 1965  7 Sheets-Sheet 2

INVENTORS
Heinz Gerjets, Hans Elsner
Siegfried Wesselhöft
Michael J. Striker
ATTORNEY Oct. 3, 1967 H. GERJETS ETAL 3,345,490
MANUAL SWITCH ACTUATOR
Filed July 13, 1965 7 Sheets-Sheet 3

INVENTORS
Heinz Gerjets, Hans Elsner,
Siegfried Wendhöft
Michael J. Striker
ATTORNEY

FIG.5

Oct. 3, 1967          H. GERJETS ETAL          3,345,490
                    MANUAL SWITCH ACTUATOR
Filed July 13, 1965                         7 Sheets-Sheet 6

INVENTORS
ATTORNEY

United States Patent Office 3,345,490
Patented Oct. 3, 1967

3,345,490
MANUAL SWITCH ACTUATOR
Heinz Gerjets, Hans Elsner, and Siegfried Wesselhöft, Wilhelmshaven, Germany, assignors to Olympia Werke AG, Wilhelmshaven, Germany
Filed July 13, 1965, Ser. No. 471,604
Claims priority, application Germany, July 14, 1964, O 10,259
31 Claims. (Cl. 200—159)

ABSTRACT OF THE DISCLOSURE

A switch actuator for closing, or opening, a switch for a predetermined time period, has a manually operated member which operates a control means through a spring so that the control means is urged to an operative position in which the manually operated member is released by holding means and moved by a spring to a normal position while the holding means operates the switch independently of the manually operated member.

---

The present invention relates to a manual switch actuator, and more particularly to a mechanical switch actuator for actuating a switch for a time period which does not depend on the manner in which the manually operated member of the switch actuator is operated.

Manually operated switches have the disadvantage that the time during which the switch is open or closed depends on the time during which a manually operated button is depressed. However, many electrical operations, which are controlled by manually operated switches, require an exact time period of actuation.

Mechanisms according to the prior art for controlling the period of actuation of a switch accomplish their purpose, but are extremely complicated, require a great deal of space, and comprise a great number of mechanical parts. Furthermore, due to the great deal of space required by the construction of the prior art, it is not possible to mount the known switch actuators for operation by the keys of a keyboard, or by closely spaced rows of buttons.

It is one object of the present invention to overcome these disadvantages of the constructions of the prior art, and to provide a mechanical manual switch actuator of compact construction, consisting of comparatively few parts, being inexpensively manufactured, and suitable for operation by the closely spaced keys of a keyboard.

Another object of the invention is to provide a mechanical manually operated switch actuator which is adjustable for actuating a switch for selected different time periods.

A related object of the invention is to provide a plurality of switch actuators controlled by the keys of a keyboard to operate correlated switches for different time periods so that the several keys of the keyboard properly control the functions with which they are associated.

Another object of the invention is to provide a manually operated switch actuator in which the time period during which a switch is actuated does not depend on the speed at which a manually controlled member is operated, but depends on the resilient force of biassing means provided on the switch actuator.

With these objects in view, the present invention relates to a manually operated switch actuator for closing, or opening, a switch for a predetermined time period. One embodiment of the invention comprises a manually operated spring loaded member, control means, biassing means, holding means, and switch means actuated either by the control means or by the holding means.

The manually operable member is held by biassing means in a normal position, and connected to the control means for holding the same in an inoperative position. When the manually operable member is actuated, biassing means connecting the manually operable member with the control means are actuated so that the control means is urged to an operative position in which the holding means is operated to permit movement of the manually operable member by the biassing means to its normal position.

The comparatively few parts of the switch actuator according to the invention take up only little space, and by control and adjustment of the inter-related motions of the manually operated member and of the control means, the time period during which the switch is actuated, can be varied. In the preferred embodiment of the invention, the control means includes a flat stem or bar which extends parallel to the stem of the key or button of the manually operated member. The key stem and the control bar may be arranged behind each other, adjacent each other, or at right angles to each other as far as the rectangular cross sections thereof are concerned. The biassing means of the manually operated member abut a frame portion, whereas the biassing means by which the control bar is operated, abuts a portion of the key stem.

A particularly simple construction is obtained if both biassing means are springs compressed in actuated condition, and surrounding a control bar and the key stem, respectively, with a small pretension.

The holding means may be constructed as a holding member movable in a direction transverse to the key stem and control bar, or may be mounted for pivotal movement. In either construction, the holding means is movable between a normal first position for holding the control means in an inoperative position while releasing the manually operable member for movement to an actuated position, and a second position for holding the manually operable member in the actuated position while releasing the control means for movement to the operative position. The holding means is operated by the manually operable member in the actuated position to move from the normal first position to the second position so that the released control means is moved by biassing means to the operative position. The holding means is also operated by the control means in the operative position to move to the first position thereof so that the manually operated member is moved by biassing means to its normal position and takes the control means back to its normal inoperative position.

The time during which a control means and the holding means are displaced out of their normal positions, is independent of the manner of operation of the manually operated member, so that the switch means is actuated for a predetermined time period.

In another embodiment of the invention, the holding means includes a spring mounted on the manually operated member and projecting into an opening in the control bar. The spring has another portion for actuating the switch. However, the switch can also be operated by a rigid shiftable holding member.

In the preferred embodiment of the invention, the actuator is mounted in a prismatic housing carrying an attaching spring by which the actuator can be detachably secured adjacent other actuators along a supporting bar provided with terminals for electric conductors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 consists of FIGS. 1a, 1b, 1c and 1d which are fragmentary vertical sectional views illustrating successive operational positions of a mechanism according to the present invention for the purpose of illustrating the principle of the operation of the switch actuator;

FIG. 2 consists of FIGS. 2a, 2b, and 2c which are fragmentary side elevations, partially in section, illustrating successive operational positions of one embodiment of the invention;

FIG. 2 consists of FIGS. 3a, 3b, and 3c which are side elevations, partially in section, illustrating successive operational positions of another embodiment of the invention;

FIG. 4 consists of FIGS. 4a, 4b, 4c and 4d which are side elevations, partially in section, illustrating successive operational positions of another embodiment of the invention;

Referring now to the drawings, and more particularly to FIG. 1, FIGS. 1a to 1d omit parts which will be explained in great detail with reference to FIGS. 2 to 5, and only illustrate certain parts for the purpose of demonstrating the principle of the operation with the greatest clarity.

A frame 6 including a top wall 6a, a vertical wall 6b, and a bottom wall 6c is provided with slots in which a key stem 1 carrying a key or button 7, and a control bar 4 are guided. Control bar 4 and key stem 1 have narrow rectangular cross sections, and in the embodiment of FIG. 1, members 1 and 4 are positioned so that the rectangular cross sections are placed transverse to each other. However, in the embodiments of FIGS. 2 and 3, the corresponding bars are aligned in the direction of the greater dimension of the rectangular cross sections, and in the embodiments of FIGS. 4 and 5, the corresponding bars are arranged with the longitudinal dimensions of the rectangular cross sections parallel to each other.

Figure 1A:
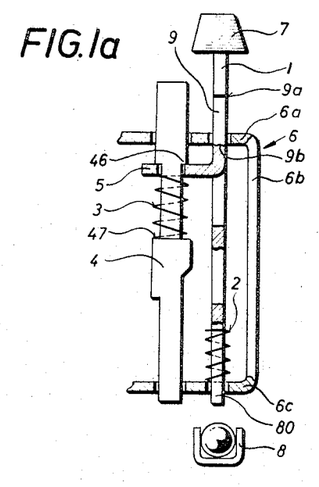

Key stem 1 has a rectangular cutout 9 with an upper horizontal edge 9a and a lower horizontal edge 9b. FIG. 1a illustrates the normal position of the device in which the lower edge 9b is located at the level of the bottom surface of top wall 6a. A biassing means, shown to be a coil spring 2 surrounding a lower portion of stem 1 and abutting a transverse projection of the same, urges the manually operable member which includes stem 1 and key 7 to the position illustrated in FIG. 1a. Further upward movement of the manually operated member is prevented by holding means, which will be described hereinafter.

Stem 1 has a transverse projection 5 formed with a cutout surrounding a narrow portion of control bar 4, so that portion 5 abuts shoulders 46 of control bar 4, and at the same time engages a biassing means, shown to be a coil spring 3 surrounding the narrow part of control bar 4 and abutting with its other end shoulders 47 of control bar 4. It is evident that projection 5 could also be constructed as a fork-shaped member, or be a narrow finger passing through a cutout in control bar 4, as will be described hereinafter with reference to FIG. 5. Due to the pressure of the slightly pretensioned spring 3 on shoulders 47, control bar 4 is urged downward to the position illustrated in FIG. 1a in which shoulders 46 abut projection 5. Control bar 4 is held by projection 5 in the normal position illustrated in FIG. 1a since the above-mentioned holding means hold the manually operable member.

Key stem 1 has a lower end portion 80 cooperating with a locking device of conventional nature including a channel 8 and a row of balls in the channel and serving the purpose of permitting only one manually operated member of a row of manually operated members to be depressed at any time. This arrangement is not an object of the present invention.

As will be explained hereinafter in great detail, the above-mentioned holding means permits movement of the manually operated member 1, 7 from the normal position of FIG. 1a to an actuated position shown in FIG. 1b, while locking control bar 4 against downward movement. Furthermore, the holding means holds the manually operable member 1, 7 in the actuated position shown in FIG. 1b, while releasing control bar 4.

Figure 1B:
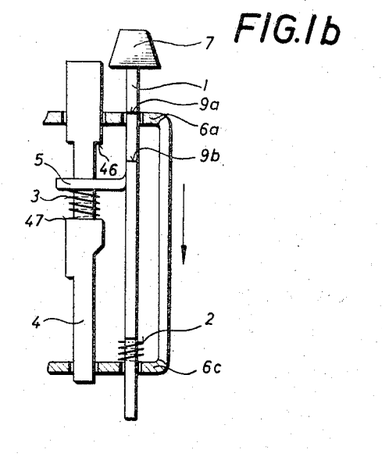
Figure 1C:
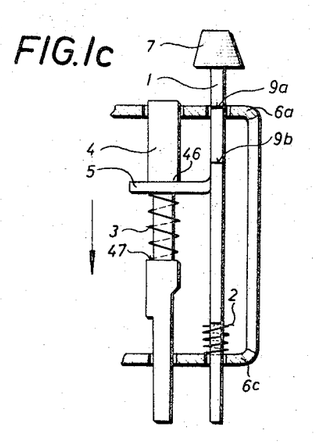
Figure 1D:
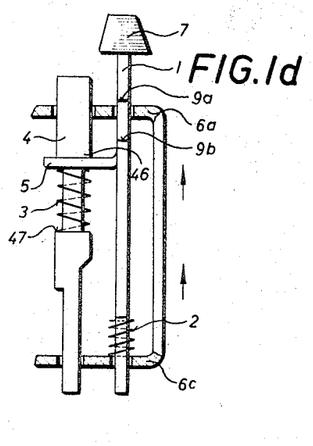

When the manually operative member 1, 7 is manually depressed to assume the position shown in FIG. 1b, springs 2 and 3 are compressed so that control bar 4 is urged to move to the operative position shown in FIG. 1c. However, control bar 4 is locked by the holding means until the manually operative member 1, 7 has arrived in its lowermost position and moves the holding means to a position releasing control bar 4 so that spring 3 expands and rapidly moves control bar 4 from the inoperative position shown in FIGS. 1a and 1b to the operative position shown in FIG. 1c.

As will be described hereinafter, control bar 4 in the lower operative position causes the holding means to release manually operable member 1, 7 so that spring 2 urges the same upward. During such movement, projection 5 engaging shoulders 46 takes control bar 4 along first to the intermediate position shown in FIG. 1d, and then to the normal position shown in FIG. 1a.

It will be seen that the start of the movement of control bar 4 to the operative position is entirely independent of the speed at which the manually operated member 1, 7 is depressed. The start of the movement of control bar 4 takes place when the manually operated member has arrived in its fully actuated position.

The holding means may be differently constructed as will now be explained with reference to FIGS. 2 to 5.

Figures 2, 2A, 2B, 2C:
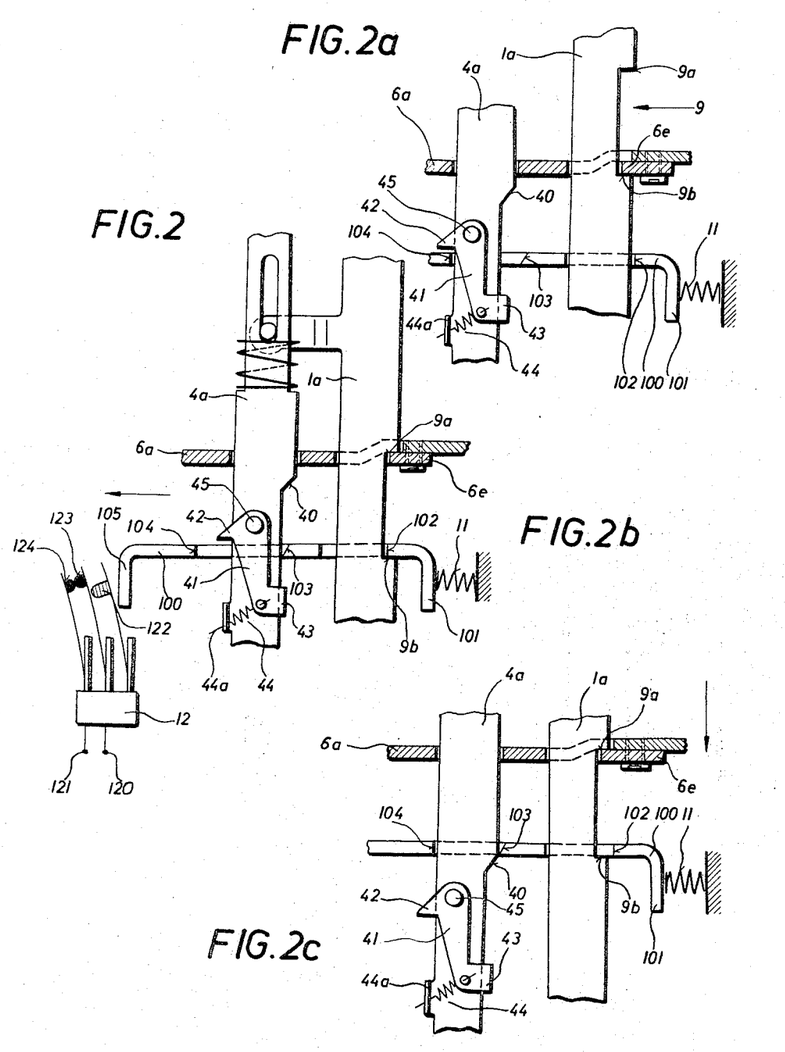

In the embodiment of FIG. 2, the manually operated member, represented by the key stem 1a is guided for vertical movement in slots of frame 6, only the top plate 6a being shown. A spring 2 is provided for urging the manually operated member to its normal position, and a spring 3 connects a projection 5 of the manually operated member with the control bar 4a, as described with reference to FIG. 1.

Top plate 6a may carry a stop plate 6e engaging shoulder 9b under the action of spring 2.

Stem 1a and control bar 4a are aligned in a plane in a direction of the longer dimension of the rectangular cross sections thereof, the plane extending from the front to the rear of the keyboard.

In the embodiment of FIG. 2, the holding means 100 is a slide guided for movement in a horizontal plane transverse to key stem 1a and control bar 4a. A transverse end portion 101 is engaged by the spring 11 abutting a frame portion, and urging holding means 100 to the left as viewed in FIG. 2. Key stem 1a passes through a slot in holding means 100, the slot having a locking edge 102 which slides on an edge of key stem 1a during downward movement of the latter, and snaps over shoulder 9b in the fully actuated depressed position of the manually operated member, shown in FIG. 2b. Consequently, the manually operable member 1a is held against the action of spring 2 by holding means 100, 102, and cannot move to its normal position shown in FIG. 2a.

Holding means 100 has a second slot bounded by stop shoulder 104, and by an inclined camming face 103. A locking pawl 41 is mounted on a pivot 45 carried by control bar 4a which passes through the slot 104, 103 in such a position that the projecting nose 42 of stop pawl 41 blocks downward movement of control bar 4a in the normal first position of the holding means 100 shown in FIG. 2a. A spring 44 connects a projection 44a of control bar 4a with stop pawl 41 so that the same is turned in clockwise direction to the position of FIG. 2a in which an abutment portion 43 abuts a lateral edge of control bar 4a.

Control bar 4a has a slanted camming face 40 cooperating with the slanted camming face 103 in the position shown in FIG. 2c.

Holding means 100 have a downwardly bent projection 105 cooperating with a switch 12 which includes a pair of springy contacts 123, 124, a resilient insulated switch member 122, and terminals 120, 121. When the manually operable member is depressed and moved to the actuated position shown in FIG. 2, holding means 100 moves a short distance to the left when passing over shoulder 9b so that projection 105 engages switch member 122 in the position shown in FIG. 2b. At the same time, the slanted face 103 is placed in a position vertically aligned with the slanted face 40. Stop edge 104 moves out of the path of movement of nose 42 of stop pawl 41, and edge 102 blocks movement of manually operable member 1a under the action of spring 2. During the downward movement of the manually operated member, spring 3 was tensioned, as described with reference to FIGS. 1a and 1b, so that control bar 4a moves downward to the position shown in FIG. 2c as soon as stop shoulder 104 releases nose 42. At the end of the travel of control bar 4a, the slanted face 40 engages the slanted face 103 so that holding means 100 is moved toward the right as viewed in FIG. 2 to its initial position in which, as shown in FIG. 2c, abutment edge 102 releases shoulder 9b of member 1a so that spring 2 moves the manually operable member back to its normal position. Since the key stem 1a is connected by projection 5 with control bar 4a, the latter is also raised to its normal inoperative position shown in FIG. 2a. During such upward movement of control bar 4a, stop shoulder 104 engages the slanted face of nose 42 and turns stop pawl 41 in counter clockwise direction to an inoperative position so that the upward movement of control bar 4a is not obstructed.

The actuation of switch 12 starts when the manually operable member arrives in its fully actuated position and holding means 100 moves to its second position shown in FIG. 2b. The actuation of the switch is terminated when holding means 100 is moved back to its first position by the engagement of slanted faces 40 and 103. The time period of actuation of switch 12 depends on the time required for the movement of control bar 4a from its upper position shown in FIGS. 2a and 2b to its lower position shown in FIG. 2c, and this time period may be adjusted, for example, by varying the tension of spring 3, or providing the slanted face 40 at a different distance from the slanted face 103.

In the embodiment of FIG. 3, the manually operated member includes a stem 1b, and control bar 4b is positioned as described with reference to FIG. 2. Members 3a and 5a connect control bar 4b with stem 1b and operate as described with reference to members 3a and 5a in FIG. 1. The manually operable member is biassed to move to its upper normal position in which shoulder 9b abuts a stop portion 6e of a top plate 6a of frame 6. The lower ends of bars 1b, 4b are guided in slots of the bottom frame plate 6c.

The holding means includes a rigid angular holding member 110 mounted on a stationary frame part by means of a pivot 117, and a leaf spring 111 secured to holding member 110 by a rivet 112 and having a curved portion 111a abutting the wall of an opening in top frame plate 6a in the normal inoperative position of the device. The lower end of leaf spring 111 has a portion 116 transversely projecting through an opening 115 in holding member 110 and having a slot 118a through which key stem 1b passes. The end portion 118 is located opposite an abutment shoulder 48 of control bar 4b in the normal first position of the holding means 110, 111.

Control bar 4b has a slanted camming face 40b cooperating with a slanted end face 114 of control member 110. A slanted abutment portion 113 is urged against the edge of key stem 1b by spring 111, and slides on this edge during downward movement of the manually operated member from the position of FIG. 3a to the position of FIG. 3b in which the abutment 113 snaps over the lower shoulder 9b of key stem 1b.

When the manually operated member is depressed, key stem 1b moves downward and is locked in the fully actuated position by the locking abutment 113. During the downward movement of the manually operable member, spring 3 is tensioned by projection 5, as explained with reference to FIG. 1. Since upward movement of the manually operable member under the action of spring 2 is blocked by locking abutment 113, spring 3 rapidly moves control bar 4b in downward direction to the operative position shown in FIG. 3 in which the slanted face 40b engages the slanted face 114 of holding member 110 to turn the same back to its initial normal position. Downward movement of control bar 4b is possible since the end portion 18 is retracted from the path of shoulder 48 of control bar 4b in the position shown in FIG. 3b in which the holding member locks the manually operable member.

As soon as the holding member 110 is pushed back by slanted face 40b to its first position, spring 2 moves the manually operable member in upward direction to its normal position which is possible due to the fact that locking abutment 113 is no longer located in the path of movement of shoulder 9b.

Figures 3A, 3B, 3C:
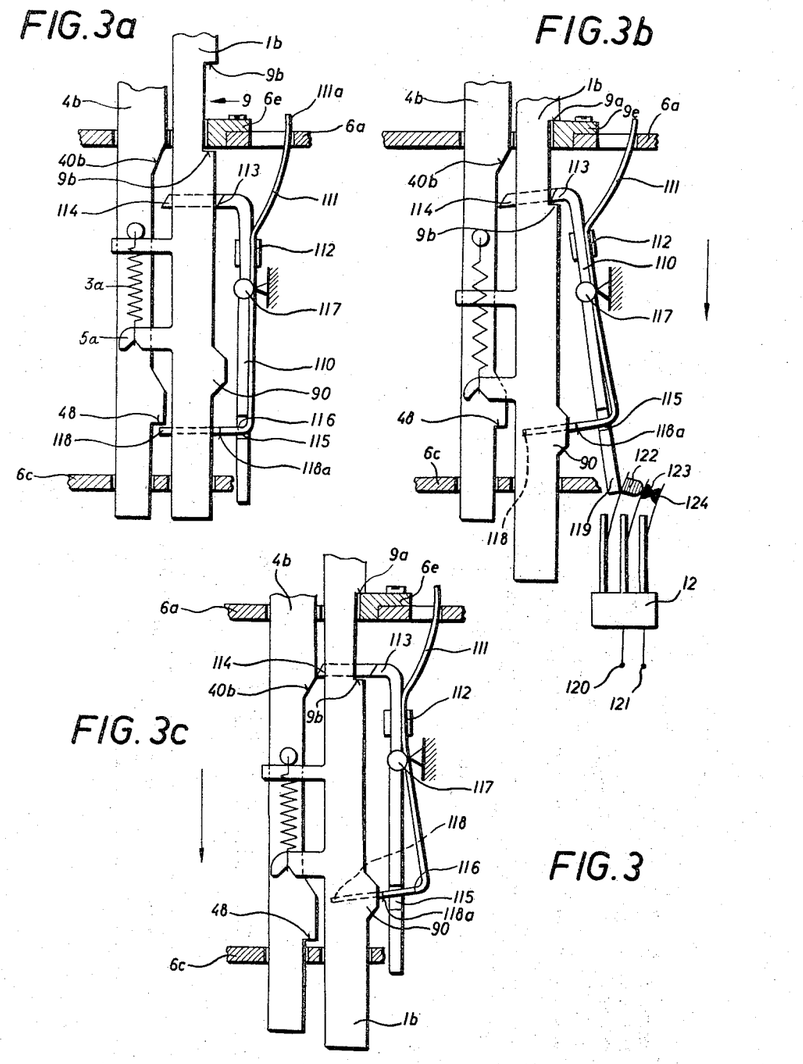

In the position of FIG. 3c, a portion 90 of key stem 1b engages the portion 118a of leaf spring 111 so that the same is held in an inoperative position in which end portion 118 cannot slide on the projection of control bar 4b forming a stop shoulder 48.

A switch 12 is actuated by the engaging portion 119 of holding member 110 in the position of FIG. 3b in which the manually operable member is in its fully actuated position. When slanted face 40b returns holding member 110 to its initial position, as shown in FIG. 3c, switch member 122 is released by the engaging portion 119, and switch 12 opens.

In the embodiment of FIG. 4, the key stem 1c and control bar 4c are guided in slots of top and bottom frame plates 6a, 6c in positions in which the rectangular cross sections thereof are parallel in the direction of the longer dimensions. A switch 12 is secured to a bent over portion 6d of frame plate 6c.

An S-shaped spring 140 is secured by a rivet 142 to key stem 1c and has a first bent portion 140 projecting through an opening 143 of key stem 1c into an opening 49 of control bar 4c. A second bent spring portion 141 cooperates with switch member 122. A portion 49a of control bar 4c separates the opening 49 from another opening 49b at the lower end of control bar 4c.

Figures 4A, 4B:
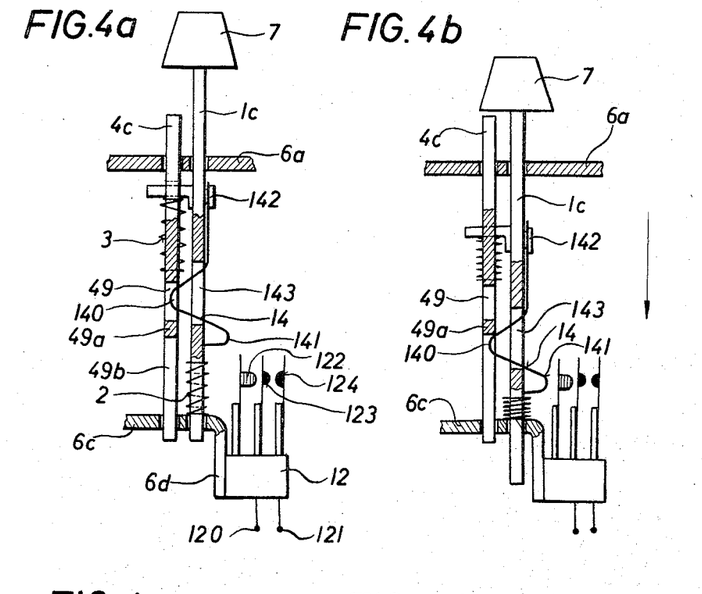

When the manually operable member 7, 1c is depressed from its normal position shown in FIG. 4a to the actuated position shown in FIG. 4b, spring portion 140 snaps from opening 49 over portion 49a into opening 49b. During this movement, spring 3 is compressed and urges control bar 4c to move downward, as explained with reference to FIG. 1, and during such downward movement, portion 49a urges spring 140 to the right as viewed in FIG. 4 so that spring portion 141 engages switch member 122 and opens switch 12. In the actuated position of the manually operable member 1c, 7, spring portion 141 is placed opposite switch member 122 as shown in FIG. 4b.

Figures 4C, 4D:
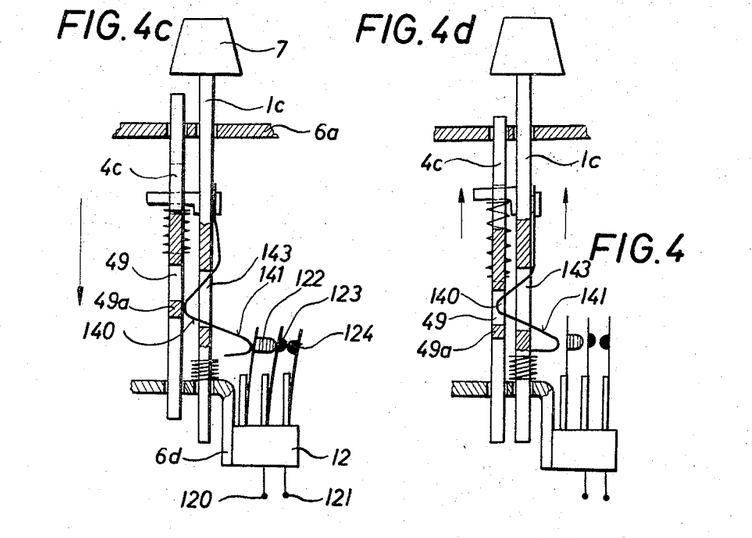

When control bar 4c arrives in its lower operative position, spring portion 140 snaps into opening 49, releasing switch member 122 so that switch 12 opens in the position shown in FIG. 4d. Spring 2 urges the manually operated member back to its normal position, and control bar 4c is taken along by spring portion 140 engaging the upper edge of opening 49. In the embodiment of FIG. 4, a holding means, not shown, corresponding to the holding means 100 of FIG. 2, and 110, 111 of FIG. 3a is provided.

Figure 5:
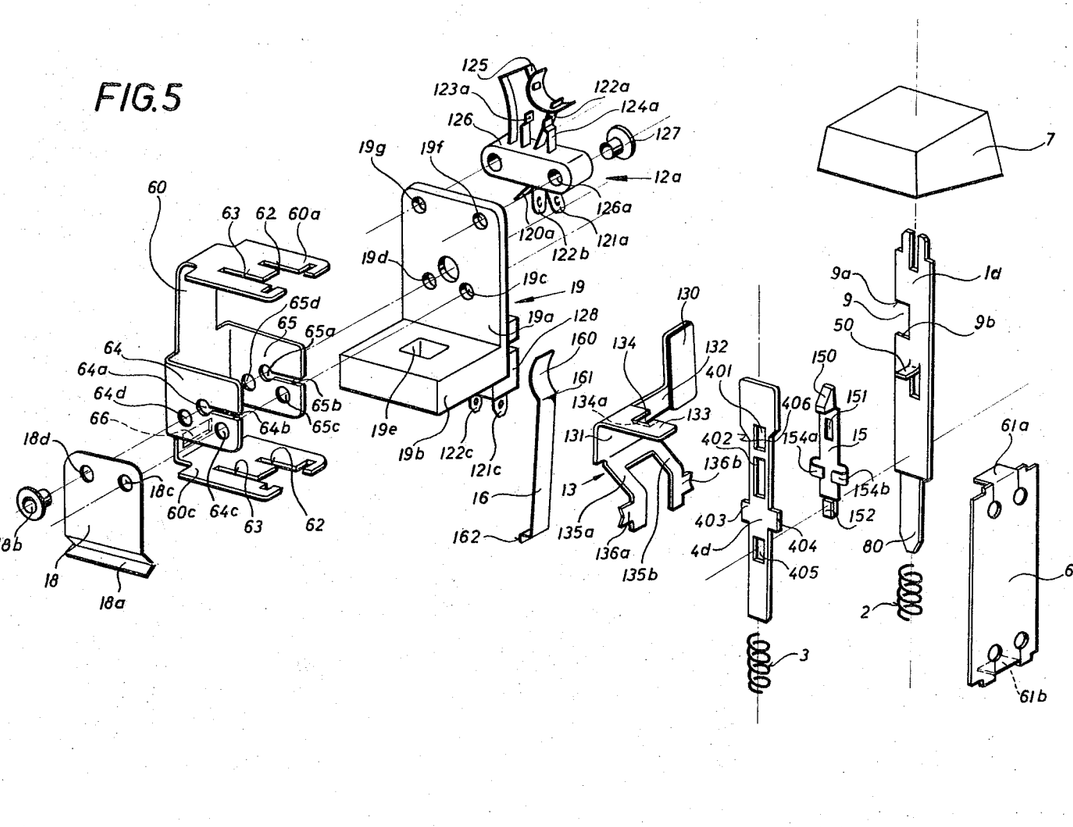
FIG. 5 is a perspective exploded view illustrating a preferred embodiment of the invention.
Figure 5A:
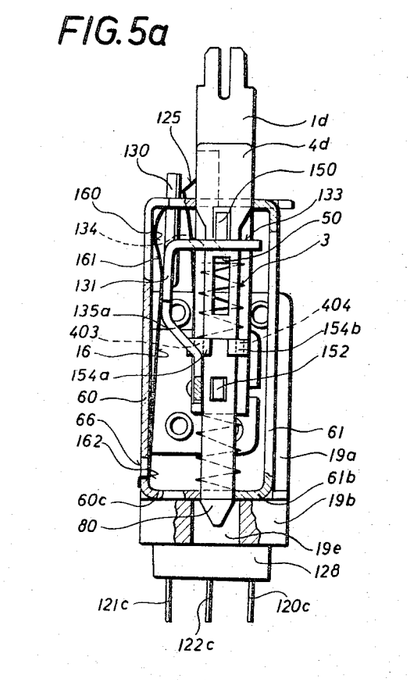
FIG. 5a is a front view, partially in section, illustrating the embodiment of FIG. 5.
Figure 5B:
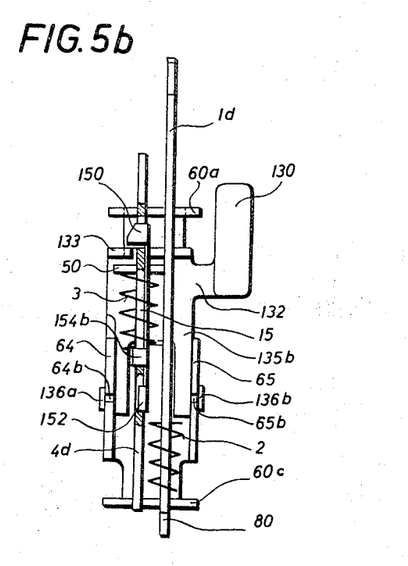
FIG. 5b is a fragmentary side elevation illustrating a part of the embodiment of FIG. 5, partially in section.
Figure 5C:
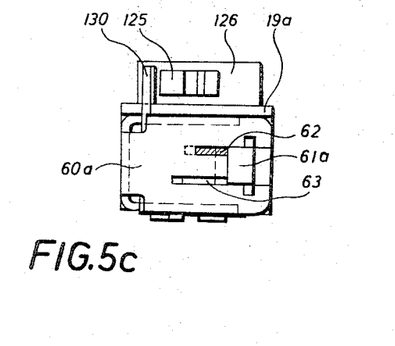
FIG. 5c is a plan view of the embodiment of FIG. 5.
Figure 5D:
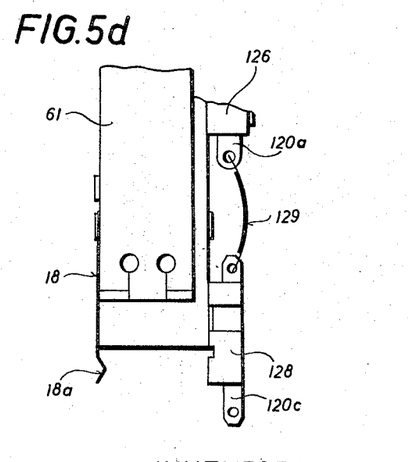
FIG. 5d is a fragmentary side elevation of the embodiment of FIG. 5.

Referring now to the embodiment illustrated in FIG. 5 and FIGS. 5a and 5d, the switch actuator has a housing 6 formed of two parts 60 and 61. Housing part 60 has an upper wall 60a and a lower wall 60c provided with guide slots 62, 63 in which the key stem 1d and control bar 4d are mounted for sliding movement in vertical direction. Key stem 1d has a projection 50, corresponding to projection 5 of the other embodiments, and projecting through a longitudinally extending slot 402 in control bar 4d. Spring 3 is mounted between projection 50 and a pair of lateral abutments 403, 404 of control bar 4d so that during downward movement of key stem 1d, spring 3 is resiliently compressed as long as downward movement of control bar 4d is blocked.

A spring 15 extends parallel to control bar 4d and has a pair of U-shaped arms 154a, 154b embracing abutment projections 403 and 404, respectively. Spring 15 has a stop nose 150 with a slanted top face and a transverse bottom face, and projecting through a cutout 401 of control bar 4d. The lower end of spring 15 has a projection located in a rectangular cutout 405 of control bar 4d. Spring 15 is thus mounted on control bar 4d for movement with the same, but when the slanted face of stop nose 150 is engaged, spring 15 is bent to a position in which stop nose 150 is pushed back into cutout 401. Spring 15 has a rectangular cutout through which projection 50 projects into rectangular cutout 402.

A holding member 13 cooperates with a key stem 1d of the manually operated member 7, 1d, 50, 80 and with control means 4d, 15, 150.

Holding means 13 has two leg portions 135a, 135b located on opposite sides of control bar 4d and key stem 1d. Journal projections 136a, 136b project from the legs into the circular openings 64a, 65a in lateral walls of housing part 60. Slots 64b, 65b permit the insertion of projections 136a, 136b in a transverse position of holding means 131 during assembly of the device. Holding means 131 further comprises a back plate 131 having a lateral arm 132 on which a switch engaging portion 130 is mounted. A projecting portion 133 extends in substantially horizontal direction from the upper edge of back plate 131, and is engaged by the lower face of stop nose 150 in the assembled condition of the device, as clearly shown in FIGS. 5a and 5b. Projecting portion 133 has a cutout 134 provided with slanted edges 134a.

A spring 16 has a lower bent end portion hooked into a cutout 66 of the back plate of housing part 60, as best seen in FIG. 5a. The upper end portion 160 of spring 16 is curved and abuts the housing wall and back plate 131 of holding member 13. Spring 16 urges holding member 13 to the position shown in FIG. 5a in which control means 4d, 15, 150 is locked by projecting portion 133 against downward movement out of its normal inoperative position in which it is held by projection 50 of manually operated member 7, 1d under the action of spring 2 which surrounds portion 80 and abuts a horizontal portion 61b of the second housing part 61 whose upper projecting plate 61a closes slots 63, 62 in top plate 60a of the first housing part 60.

A carrier 19 has a base portion 19b on which the bottom plate 60c of housing part 60, and the bottom plate 61b of housing part 61 rest. Bottom plate 61b closes slots 62, 63 in bottom plate 60c.

Base portion 19b has a central opening 19e through which the lower portions of control bar 4d and key stem 1d pass. Portion 80 cooperates in the usual way with the balls of a locking channel 8, shown in FIG. 1a.

A lateral wall 19a of carrier 19 has openings 19d and 19c aligned with openings 65d and 65c of lateral plate 65 of housing part 60 so that housing part 60 can be attached to carrier 19 by suitable rivets. Lateral wall 19a has two other openings 19g and 19f permitting the attachment of a switch 12a by means of rivets 127. Switch 12a includes an insulating body 126 having openings 126a for rivets 127, and supporting terminals 120a, 121a, 122b respectively connected with contacts 123a, 124a and 122a. Contact 122a has a projecting portion cooperating with a switch member 125 cooperating with the engaging portion 130 of holding member 13, as best seen in FIG. 5c. An insulating block 128 is secured to the lower portion of wall 19a, as shown in FIGS. 5 and 5d, and carries terminals 120c, 121c and 122c to which conductors may be attached. Connector wires 129 connect the terminals on block 128 with the terminals of switch 12a, as best seen in FIG. 5d.

Figure 6:
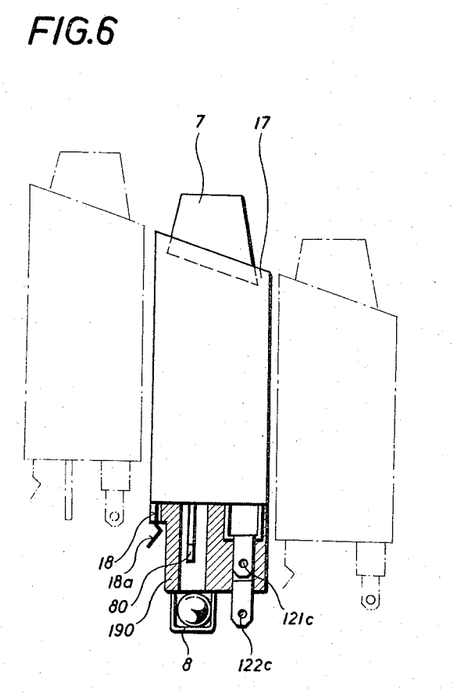
FIG. 6 is a side elevation, partially in section, illustrating switch actuators according to the embodiment of FIG. 5 mounted in a keyboard.

A spring plate 18 has openings 18c and 18d registering with openings 64c and 64d in the lateral plate 64 of housing part 60, so that spring plate 18 can be attached by rivets 18b to housing part 60. The lower portion of spring plate 18 has an angular projection 18a which serves for detachably attaching the switch actuator to a carrier bar 190, as shown in FIG. 6. In this manner, a row of switch actuators can be mounted on a single carrier bar 190, with the springy projection 18a of each switch actuator snapping over a shoulder of bar 190. Bar 190 has a passage for each locking portion 80 of each key stem 1d, and when one of the keys 7 is depressed, portion 80 passes between adjacent balls in a channel 8 extending along the carrier bar 90. The ends of channel 8 are closed, and the balls are spaced in the channel to permit only one member 80 to enter between the balls so that no second key can be actuated as long as one key is in the depressed actuated position.

When key 7 is depressed, the manually operated member moves to an actuated position while projection 50 compresses spring 3 which abuts abutment portions 403, 404 of control bar 4d, urging the control means 4d, 15 downward. However, the control means can only move under the action of spring 3 when an edge of cutout 134 of projecting portion 133 of holding means 13 snaps over shoulder 9b of cutout 9 of key stem 1d in the lower actuated position of the manually operated member.

When holding means 13 is thus turned in clockwise direction, cutout 134 is placed under stop nose 150, permitting the compressed spring 3 to move control means 4d, 15 downward to an operative position in which the slanted edge 406 of control bar 4d engages a corresponding slanted edge of cutout 134 in projecting portion 133 and turns holding member 13 back in counter clockwise direction to its initial position.

As soon as shoulder 9b permits clockwise turning of holding member 13 to its second position, engaging portion 130 engages switch member 125 and actuates switch 12a, not shown in FIGS. 5a, 5b and 5c for the sake of simplicity. When holding member 13 is turned back in counter clockwise direction by engagement between slanted face 406 and the slanted edge of cutout 134, engaging portion 113 releases switch member 135 and the switch opens.

When holding member 13 is returned to its first position, portion 133 moves out of cutout 9, and spring 2 moves the thus released manually operable member to its normal position, control means 4d, 15 being taken along by projection 50 engaging the upper edges of cutouts 151 and 401. When the slanted upper face of stop nose 150 engages portion 130, spring 15 is bent and stop nose 150 is pressed back into cutout 401 of control bar 4d so that the upward movement of the control bar is not obstructed by the holding member 13.

FIG. 6 schematically indicates the manner in which several rows of switch actuators can be mounted in such a manner that the keys 7 form a keyboard. For each row of keys and switch actuators, a support bar 190 is provided, several support bars extending parallel to each other, but only one support bar being shown in FIG. 6. The housing 60, 61 is further enclosed in an outer casing 17 which is open at the bottom, and has on a top a cutout sufficient for the passage of the respective key 7. FIG. 6 clearly shows that the compact prismatic shape of the switch actuators according to the present invention permit the mounting of the switch actuators on a business machine in such a manner that the keys 7 are spaced from each other the standard distances required for manual operation.

It will be understood that each of the elements described above, or two or more together, may also find a useful application in other types of switch actuators differing from the types described above.

While the invention has been illustrated and described as embodied in a manual switch actuator in which a time period of actuation of a controlled switch is independent of the speed of movement of the manually operable member of the switch actuator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be secured by Letters Patent is:

1. A manual switch actuator comprising, in combination, control means movable between an inoperative position and an operative position; a manually operable member movable between a normal position and an actuated position; means connecting said member with said control means; first biassing means connecting said manually operable member with said control means; second biassing means for urging said manually operable member to said normal position; holding means operatively connected with said manually operable member and with said control means for holding said control means in said inoperative position while releasing said manually operable member for movement to said actuated position, and for holding said manually operable member in said actuated position while releasing said control means for movement to said operative position, said holding means being controlled by said manually operable member in said actuated position so that said first biassing means moves said control means to said operative position, said holding means being operated by said control means in said operative position so that said second biassing means moves said manually operable member to said normal position whereby said control means is moved to said inoperative position; and switch means actuated at least by one of said means independently of said manually operable member.

2. A manual switch actuator comprising, in combination, control means movable between an inoperative position and an operative position; a manually operable member movable between a normal position and an actuated position; means connecting said member with said control means for moving the same from said operative position to said inoperative position when said member moves from said actuated position to said normal position; first biassing means connecting said manually operable member with said control means and being actuated in said actuated position of said member to urge said control means to said operative position; second biassing means for urging said manually operable member to said normal position and thereby said control means to said inoperative position; holding means operatively connected with said manually operable member and with said control means, and being movable between a normal first position for holding said control means in said inoperative position while releasing said manually operable member for movement to said actuated position, and a second position for holding said manually operable member in said actuated position while releasing said control means for movement to said operative position, said holding means being controlled by said manually operable member in said actuated position to move from said normal first position to said second position so that said first biassing means moves said control means to said operative position, said holding means being operated by said control means in said operative position to move to said first position so that said second biassing means moves said manually operable member to said normal position whereby said control means is moved to said inoperative position; and switch means actuated at least by one of said means independently of said manually operable member.

3. A manual switch actuator comprising, in combination, control means movable between an inoperative position and an operative position; a manually operable member movable between a normal position and an actuated position; means connecting said member with said control means for moving the same from said operative position to said inoperative position when said member moves from said actuated position to said normal position; first biassing means connecting said manually operable member with said control means and being actuated in said actuated position of said member to urge said control means to said operative position; second biassing means for urging said manually operable member to said normal position and thereby said control means to said inoperative position; holding means operatively connected with said manually operable member and with said control means, and being movable between a normal first position for holding said control means in said inoperative position while releasing said manually operable member for movement to said actuated position, and a second position for holding said manually operable member in said actuated position while releasing said control means for movement to said operative position, said holding means being controlled by said manually operable member in said actuated position to move from said normal first position to said second position so that said first biassing means moves said control means to said operative position, said holding means being operated by said control means in said operative position to move to said first position so that said second biassing means moves said manually operable member to said normal position whereby said control means is moved to said inoperative position; and switch means actuated at least by said holding means in said second position independently of said manually operable member.

4. A manual switch actuator comprising, in combination, control means movable between an inoperative position and an operative position; a manually operable member movable between a normal position and an actuated position; means connecting said member with said control means for moving the same from said operative position to said inoperative position when said member moves from said actuated position to said normal position; first biassing means connecting said manually operable member with said control means and being actuated in said actuated position of said member to urge said control means to said operative position; second biassing means for urging said manually operable member to said normal position and thereby said control means to said inoperative position; holding means including a holding member operatively connected with said manually operable member and with said control means, and being movable between a normal first position for holding said control means in said inoperative position while releasing said manually operable member for movement to said actuated position, and a second position for holding said manually operable member in said actuated position while releasing said control means for movement to said operative position, and a spring urging said holding member into said second position, said holding member being released by said manually operable member in said actuated position to move from said normal first position to said second position so that said first biassing means moves said control means to said operative position, said holding member being operated by said control means in said operative position to move to said first position so that said second biassing means moves said manually operable member to said normal position whereby said control member is moved to said inoperative position; and switch means actuated at least by said holding means in said second position independently of said manually operable member.

5. A manual switch actuator comprising, in combination, control means movable between an inoperative position and an operative position; a manually operable key member movable between a normal position and an actuated position; means connecting said key member with said control means for moving the same from said operative position to said inoperative position when said key member moves from said actuated position to said normal position; first spring means connecting said key member with said control means and being actuated in said actuated position of said key member to urge said control means to said operative position; second spring means for urging said key member to said normal position and thereby said control means to said inoperative position; holding means operatively connected with said key member and with said control means, and being movable between a normal first position for holding said control means in said inoperative position while releasing said key member for movement to said actuated position, and a second position for holding said key member in said actuated position while releasing said control means for movement to said operative position, said holding means being controlled by said key member in said actuated position to move from said normal first position to said second position so that said first spring means moves said control means to said operative position, said holding means being operated by said control means in said operative position to move to said first position so that said second spring means moves said key member to said normal position whereby said control means is moved to said inoperative position; and switch means actuated at least by said holding means in said second position independently of said key member.

6. A manual switch actuator comprising, in combination, supporting means; control means including a control bar mounted on said supporting means for movement in one direction between an inoperative position and an operative position; a manually operably key member mounted in said supporting means for movement in a direction parallel to said direction between a normal position and an actuated position; means connecting said key member with said control means for moving the same from said operative position to said inoperative position when said key member moves from said actuated position to said normal position; first spring means connecting said key member with said control means and being actuated in said actuated position of said key member to urge said control means to said operative position; second spring means abutting said supporting means for urging said key member to said normal position and thereby said control means to said inoperative position; holding means operatively connected with said key member and with said control means, and being mounted on said supporting means for movement in a direction transverse to said directions between a normal first position for holding said control means in said inoperative position while releasing said key member for movement to said actuated position, and a second position for holding said key member in said actuated position while releasing said control means for movement to said operative position, said holding means being controlled by said key member in said actuated position to move from said normal first position to said second position so that said first spring means moves said control means to said operative position, said holding means being operated by said control means in said operative position to move to said first position so that said second spring means moves said key member to said normal position whereby said control means is moved to said inoperative position; and switch means actuated at least by said holding means in said second position independently of said key member.

7. A switch actuator as set forth in claim 6 wherein said connecting means include a transverse projection on said key member abutting one end of said first spring means and an abutment on said control bar, the other end of said first spring means abutting an abutment on said control bar.

8. A switch actuator as set forth in claim 7 wherein said projection of said key member is fork-shaped and embraces said control bar, said first spring means abutting said fork-shaped projection.

9. A switch actuator as set forth in claim 7 wherein said control bar has an elongated slot, and wherein said projection on said key member passes through said slot and being urged by said first spring means against one end of the same.

10. A switch actuator as set forth in claim 7 wherein said control bar has a shoulder abutting said projection of said key member under the action of said first spring means so that said control bar and said key member are connected during movement of said key member from said actuated position to said normal position.

11. A switch actuator as set forth in claim 6 wherein said first spring means is a compression coil spring surrounding a portion of said control bar, and wherein said second spring means is a coil spring surrounding a portion of said key member, said coil springs being pretensioned.

12. A switch actuator as set forth in claim 6 wherein said key member has a stem formed with a cutout having first and second shoulders spaced along said key stem, said shoulders respectively abutting said supporting means in said normal and actuated positions of said key member; and wherein said holding means include a holding member movable between said first and second positions, and a spring urging said holding member to said second position, said holding member engaging one of said shoulders in said actuated position of said key member for blocking movement of the same to said normal position.

13. A switch actuator as set forth in claim 12 wherein said holding member is mounted on said supporting means for rectilinear movement in a direction transverse to said key stem and control bar, said key stem and said control bar being parallel, said holding member releasing said key stem and blocking said control means against movement to said operative position when said manually operable member is in said normal position.

14. A switch actuator as set forth in claim 13 wherein said control means includes a spring loaded stop pawl mounted on said control bar for turning movement and abutting said control member in said normal first position of the same for blocking movement of said control bar to said operative position, said stop pawl having a slanted surface slidingly engaged by said holding member during movement of said control bar from said operative position to the inoperative position whereby said stop pawl is turned to a position permitting movement of said control bar.

15. A manual switch actuator comprising, in combination, supporting means; control means including a control bar mounted on said supporting means for movement in one direction between an inoperative position and an operative position, a spring-loaded stop pawl mounted on said control bar; a manually operable member including a stem and a key on said stem, said stem being mounted on said supporting means, and said key member being movable between a normal position and an actuated position, said stem being parallel to said control bar and having a transverse projection extending across said control bar and having an upper face engaging an abutment on said control bar so that the same moves from said operative position to said inoperative position when said key member moves from said actuated position to said normal position; a first spring means extending between an abutment of said control bar and the underside of said projection and being compressed in said actuated position of said key member to urge said control means to said operative position; second spring means abutting said supporting means and abutment on said stem for urging said key member to said normal position and thereby said control means to said inoperative position; holding means including a holding member mounted on said supporting means for movement transverse to said control bar and said key stem and having abutments cooperating with abutments on said key stem and with said stop pawl, and having a slanted camming face cooperating with a slanted camming face of said control bar, said holding member having a normal first position abutting said key stem under the action of said spring with an abutment thereof located in the path of movement of said stop pawl for holding said control means in said inoperative position while releasing said key member for movement to said actuated position, and a second position in which an abutment thereof engages an abutment of said key stem for holding said key member in said actuated position while releasing said control means for movement to said operative position, and a spring urging said holding member to said second position, said holding member being released by said key member in said actuated position to be moved by said spring from said normal first position to said second position so that said first spring means moves said control means to said operative position, said slanted camming face of said control bar engaging said slanted camming face of said holding member in said operative position to move said holding member back to said first position so that said second spring means moves said key member to said normal position whereby said control means is moved to said inoperative position while said stop pawl is displaced by said abutment of said holding member to permit movement of the control bar; and switch means actuated by said holding member independently of said key member.

16. In a switch actuator as set forth in claim 6 wherein said holding means includes an angular holding member mounted on said supporting means for turning movement between said first and second positions, and a spring secured to said holding member and having a portion resiliently engaging said supporting means so that said control member is urged to said second position, said key member having a cutout with a shoulder abutting said supporting means in said normal position, and passing a portion of said holding member in said actuated position so that said holding member is moved by said spring to a position located in said cutout and blocking movement of said key member to said normal position under the action of said second spring means, said control bar having an abutment abutting a portion of said spring in said inoperative position when said holding means is in said first position, said abutment being released by said spring in said second position so that said control bar moves to said operative position, said control bar having a slanted camming face, and said holding member having a slanted camming face engaged by said first mentioned slanted camming face in said operative position of said control bar so that said holding member is moved back to said first position, said key member having an abutment engaging said spring in said actuated position of said key member for tensioning said spring.

17. A switch actuator as set forth in claim 16 wherein said spring is a leaf spring having a curved end portion abutting said supporting means, and another transverse end portion cooperating with said abutment of said control bar and of said key member.

18. A switch actuator as set forth in claim 17 wherein said transverse portion of said spring has an opening through which said key member passes, said opening having an edge cooperating with said abutment of said key member.

19. A switch actuator as set forth in claim 4 wherein said holding member has an engaging portion cooperating with said switch means.

20. A switch actuator as set forth in claim 6 wherein said key member has a stem mounted on said supporting means parallel to said control bar and for movement parallel to the same, said stem having an opening, and said control bar having a first opening registering with said opening in said stem in said normal and inoperative positions, said control bar having a second opening, and a control portion between said first and second openings; and wherein said holding means includes a leaf spring secured to said stem and having an angular central portion projecting through said opening in said stem into said first opening in said control bar in said normal and inoperative positions, and an end portion cooperating with said switch means, and being located in the region of the same in said actuated position of said key member, said angular portion of said spring being displaced by said control portion during movement of said control bar to said operative position under the action of said first spring means so that said end portion of said leaf spring engages said switch means and actuates the same.

21. A switch actuator as set forth in claim 20 wherein said control portion has such a length that said switch means is actuated for a predetermined time period after which said angular portion of said leaf spring passes into said first opening of said control bar when the same arrives in said operative position.

22. A manual switch actuator comprising, in combination, supporting means; a control bar mounted on said supporting means for movement between an inoperative position and an operative position, said control bar having an abutment and a slanted camming face; a manually operable key member having a stem mounted on said supporting means parallel with said control bar and movable between a normal position and an actuated position, said stem having a cutout bounded by a shoulder, and an abutment; connecting means for connecting said stem with said control bar for moving the same from said operative position to said inoperative position when said key member moves from said actuated position to said normal position; first spring means connecting said key member with said control bar and being actuated in said actuated position of said key member to urge said control bar to said operative position; second spring means abutting said supporting means and said stem for urging said key member to said normal position and thereby said control bar to said inoperative position; holding means including a holding member mounted for pivotal movement on said supporting means, and a leaf spring secured to said holding member and having a portion engaging said supporting means, and a transverse portion having abutments cooperating with said abutments of said stem and of said control bar, said holding member having a portion cooperating with said shoulder of said cutout, and a slanted camming face cooperating with said camming face of said control bar, said holding means being movable between a normal first position in which said leaf spring engages said abutment of said control bar for holding the same in said inoperative position, and a second position in which said portion of said holding member is located in said cutout and engages said shoulder in said actuated position of said key member so that said first spring means moves said control bar to said operative position, said slanted face of said control bar engaging said slanted face of said holding member in said operative position of said control bar for moving said holding means to said first position so that said second spring means moves said key member to said normal position whereby said control bar is moved to said inoperative position; and switch means actuated by portion of said holding member in said second position, and released by the same in said first position.

23. A switch actuator comprising, in combination, a control bar movable between an inoperative position and an operative position, said control bar having first and second openings, and a control portion between said first and second openings; a manually operable key member including a stem parallel with said control bar, and being movable between a normal position and an actuated position, said stem having an opening aligned with said first opening in said inoperative and normal positions; first spring means connecting said control bar with said key member and being actuated in said actuated position of said key member to urge said control bar to said operative position; second spring means for urging said key member to said normal position; connecting means connecting said key member with said control bar for moving the latter from said operative position to said inoperative position when said key member moves from said actuated position to said normal position; holding means including a leaf spring secured to said stem and having a central angular portion projecting through said opening in said stem and into said first opening when said control bar is in said inoperative position and said key member is in said normal position, said spring having an end portion located on the side of said stem remote from said control bar, said spring moving with said key member from said normal position to said actuated position while said central angular portion moves out of said first opening and over said control portion into said second opening whereupon said first spring means urges said control bar to said operative position causing engagement of said central angular spring portion by said control portion and displacement of said end portion of said spring to a displaced position; and switch means actuated by said spring end portion said displaced position.

24. A switch actuator as set forth in claim 6 wherein said control bar has an opening, and wherein said control means includes a spring having a stop nose and being secured to said control bar in a position in which said stop nose projects through and out of said opening; wherein said holding means includes a holding member mounted for pivotal movement on said supporting means and having a projecting portion cooperating with said stop nose in said first position for holding said control means in said inoperative position, said stop nose having a slanted face engaged by said portion during movement of said control means from said operative position to said inoperative position whereby said stop nose is moved out of the path of movement of said control means.

25. A switch actuator as set forth in claim 24 wherein said supporting means include a housing having a first housing part and a second housing part, said first housing part having top and bottom walls formed with slots slidingly receiving said control bar and said key member, said slots being open at the ends, said second housing part having top and bottom walls for closing the open ends of said slots.

26. A switch actuator as set forth in claim 25 wherein said first housing part has a pair of lateral walls formed with openings aligned with each other, and wherein said holding member has journal projection located in said openings of said walls for supporting said holding member for turning movement, said holding means including a spring located in said housing and mounted on said first housing part for urging said holding member into said normal first position.

27. A switch actuator set forth in claim 26 wherein said supporting means include a support having a base plate located under the bottom plates of said first and second housing parts and a lateral wall; and wherein said switch means is mounted on said lateral wall.

28. A switch actuator set forth in claim 27 and including a spring plate secured to one of said lateral walls of said first housing part, and having a projecting resilient catch portion.

29. A plurality of switch actuators as set forth in claim 28 arranged in a row; and a supporting bar supporting said switch actuators and having a shoulder resiliently engaged by said projection of said spring plates of said switch actuators so that the same are detachably mounted on said support bar.

30. A switch actuator as set forth in claim 28 and including a casing enclosing said switch actuator and being open at the bottom and on top, said key member including a key projecting from said top of said casing, and including terminals secured to said support member and projecting from said open bottom end of said casing.

31. A manual switch actuator comprising, in combination, a housing including a first housing part and a second housing part forming together aligned slots; control means including a control bar mounted in a pair of said slots for movement between an inoperative position and an operative position, said control bar having an opening, and a resilient stop member mounted on said control bar and having a stop nose projecting through said opening and having an inclined top face and a bottom face; a manually operable key member including a stem mounted in a pair of said slots in said housing for movement between a normal position and an actuated position, said stem having a cutout bounded by a shoulder, and a transverse projection located in said opening of said control bar for moving said control means from said operative position to said inoperative position when said key member moves from said actuated position to said normal position; first spring means surrounding said control bar abutting the same and said projection of said key member, said first spring means being compressed in said actuated position of said key member; second spring means surrounding a portion of said stem and abutting said stem and said second casing part for urging said key member to said normal position and thereby said control means to said inoperative position; holding means including a holding member mounted for turning movement on said first housing part, and a spring abutting said first housing part and said holding member and urging the same to a normal first position in which said bottom face of said stop nose abuts a portion of said holding member for holding said control means in said inoperative position, said holding member having a second position in which a portion thereof engages said shoulder of said cutout for holding said key member in said actuated position so that said first spring means moves said control means to said operative position, said holding member in said second position being engaged by a slanted portion of said control bar in said actuated position so as to be moved back to said first position whereby said second spring means moves said key member to said normal position upon disengagement of said shoulder of said cutout by said holding member; and switch means mounted on said first housing part and actuated by said holding member in said second position independently of said key member.

References Cited
UNITED STATES PATENTS

| | | | |
|---|---|---|---|
| 2,549,615 | 4/1951 | Long | 200—172 X |
| 3,172,296 | 3/1965 | Tancred | 200—153 X |
| 3,281,565 | 10/1966 | Grady et al. | 200—172 |

ROBERT S. MACON, *Primary Examiner.*

ROBERT K. SCHAEFER, *Examiner.*

H. BURKS, *Assistant Examiner.*